Patented May 13, 1947

2,420,568

UNITED STATES PATENT OFFICE 2,420,568

RODENT AND INSECT POISON

E. Francis Sennewald, St. Louis, Mo.

No Drawing. Application October 23, 1944,
Serial No. 560,046

5 Claims. (Cl. 167—15)

This invention relates to rodent and insect poisons and baits and more particularly to poisons and baits containing an arsenical as the active ingredient.

Among the objects of this invention are the provision of an improved insect and rodent poison containing arsenic; the provision of a poison which is water soluble and free from objectionable taste; the provision of a poison which exerts a preservative action upon food products; the provision of improved methods and baits for killing insects and rodents; the provision of improved methods for preparing poisoned baits; and the provision of a poison which is stable over extended periods of time and when exposed to varying temperatures. Other objects will be in part apparent and in part pointed out hereinafter.

The invention accordingly comprises the ingredients and combinations of ingredients, the proportions thereof, steps and sequence of steps, and features of composition and manipulation, which will be exemplified in the products and methods hereinafter described, and the scope of the application of which will be indiciated in the following claims.

Trivalent arsenic is, in the form of its compounds, frequently used to kill insects (including sow bugs and pill bugs which, strictly speaking, are not insects) and rodents. The arsenic compounds are incorporated into various baits or placed where the insect or rodent may eat it. The toxicity of one of the cheapest arsenic compounds, arsenic trioxide, is directly proportional to the particle size. Finely ground arsenic trioxide is much more toxic than coarse powdered arsenic trioxide. Water soluble arsenic compounds have a much greater toxicity than relatively water insoluble arsenic trioxide. However inorganic water soluble arsenic compounds such as sodium arsenite or sodium arsenate are very alkaline and have a bitter alkaline taste.

Because it is inexpensive, arsenic trioxide is frequently used as such even though a relatively larger proportion is needed and even though it is difficult to incorporate into a satisfactory bait. The more water soluble arsenic compounds are not attractive to the insect or rodent because of their taste.

According to the present invention water soluble compositions of arsenic trioxide are provided which have in dilute aqueous solutions a very slight bland sweet taste. These compositions are palatable, assimilable and very toxic to rodents such as rats and mice, and to insects.

The toxic compositions of the present invention are solutions of arsenic trioxide in hexahydric alcohols such as sorbitol and mannitol. The solutions of the present invention are prepared by dissolving arsenic trioxide in the hexahydric alcohol either by fusing the two together or by boiling together a concentrated aqueous solution of the hexahydric alcohol and arsenic trioxide until the latter is dissolved.

The following examples are illustrative only.

*Example 1*

Arsenic trioxide (50 gms.) and crystalline sorbitol (50 gms.) are fused together at a temperature of 130° C. for about one hour. The fused mass, which is a semi-solid, is allowed to cool and then mixed with hot water (50 ml.). The resulting mixture is allowed to cool and then filtered to remove excess arsenic trioxide. The filtrate is evaporated until all of the water is driven off. The resulting straw colored, thick, viscous liquid is miscible with water and contains 45.4% arsenic trioxide.

*Example 2*

A concentrated aqueous solution containing 50 gms. of crystalline sorbitol is heated to boiling and arsenic trioxide (50 gms.) is added to the boiling solution. The boiling is continued for about thirty minutes. The mixture is allowed to cool and the excess arsenic trioxide is removed by filtration or decantation. The arsenic trioxide present in the resulting solution is substantially the same as in Example 1.

*Example 3*

One pint of a 10% aqueous solution of arsenic trioxide in sorbitol prepared by diluting the solution of Example 1 or Example 2, is mixed with four pounds of a mixture of dry bread crumbs or dry oatmeal and fresh ground meat or fresh ground fish. The finished mixed bait will contain an arsenic concentration of 2% arsenic trioxide. The bait is very effective for killing rats and mice.

*Example 4*

One pint of an aqueous solution of arsenic trioxide in sorbitol containing 4% arsenic trioxide is poured over and mixed with one pound of bread or stale cake, broken up into small pieces. The poison bait contains approximately 2% arsenic trioxide and is highly effective in killing rodents.

*Example 5*

A concentrated solution of arsenic trioxide in sorbitol containing 10% arsenic trioxide, is applied to bait material attractive to rats and mice with a paint brush. Pieces of meat, fish, bread, cake, corn-on-the-cob and similar material can be so treated. The poison bait is highly effective in killing rats and mice.

*Example 6*

A concentrated solution of arsenic trioxide in sorbitol is mixed with spreads such as butter, jams, jellies, peanut butter or lard and spread on bread. The bait is very effective in killing rats and mice.

*Example 7*

A concentrated solution of arsenic trioxide in sorbitol is applied around rat and mouse holes and to their runways. The solution is sticky and non-drying and it sticks to their feet and fur. The rats and mice upon licking their feet and fur to rid themselves of the sticky poison adhering to them, swallow enough of the poison to kill them.

Sorbitol solutions of arsenic trioxide are also useful as insecticides. Because of the variable solubility of arsenic trioxide and the difficulty of getting as much as 1% in solution, the more soluble arsenates and arsenites of sodium have been used as stomach poisons for insects. Solutions of arsenic trioxide in sorbitol provide improved substitutes for the previously used arsenic salts, and related compositions such as thallium sulfate.

*Example 8*

An ant syrup is prepared by mixing together a sorbitol solution (10 pounds) of arsenic trioxide containing 10% arsenic trioxide, sugar syrup (70 pounds) made from cane sugar and water, and honey (20 pounds). The resulting syrup is highly effective against ants.

*Example 9*

The Paris green, sodium arsenite or white arsenic in grasshopper or Mormon cricket baits is replaced with a concentrated solution of arsenic trioxide in sorbitol. The resulting bait is not only highly effective against grasshoppers or Mormon crickets but the sorbitol solution of arsenic trioxide aids in keeping the bait soft and attractive.

Similarly concentrated solutions of arsenic trioxide in sorbitol diluted in water may be used for other purposes such as soil treatment for termites, in poison fly paper, in cattle dips, as weed killers, as preservatives for zoological specimens and in taxidermy.

*Example 10*

Mannitol (50 gms.) and arsenic trioxide (50 gms.) are fused together for two hours at a temperature of 180° C., the product is allowed to cool and the fused mixture is extracted with hot water (100 ml.) until all of the arsenic-mannitol solution has gone into aqueous solution. The resulting solution is cooled and filtered to remove excess arsenic trioxide and the filtrate is evaporated to dryness. The resulting clear, glassy appearing solid contains 43% arsenic trioxide. The mannitol-arsenic trioxide solution is slightly hygroscopic and upon exposure to damp air becomes tacky. It is miscible with water.

The arsenic trioxide solution in mannitol can be used in the same ways as the arsenic trioxide solution in sorbitol to control rats, mice and insects. In addition the mannitol solution of arsenic trioxide can be powdered and used as a dust on baits for rats, mice and insects. Inert diluent such as talc or milk sugar may be mixed with the powdered mannitol solution of arsenic trioxide to keep it in powdered form.

*Example 11*

A mannitol solution of arsenic trioxide is dissolved in water and is used to impregnate grain to be used to control rats and mice. The grain is soaked in a solution of the poison for several days and then dried. A concentration of mannitol solution of arsenic trioxide in the dried grain equivalent to 1.5% arsenic trioxide is sufficient to kill both rats and mice.

The mannitol solution of arsenic trioxide is, due to its relatively slight hygroscopic effect, preferable to the corresponding sorbitol solution of arsenic trioxide for certain purposes.

The arsenic trioxide solutions in hexahydric alcohols are of very high toxicity. Baits containing as little as the equivalent of 1% arsenic trioxide, of the hexahydric alcohol solution are very toxic to rats and mice. A concentration of 2% arsenic trioxide is preferred however so that a rat or mouse not particularly hungry or thirsty that merely nibbles on the bait will get enough of the poison to produce death. Liquid baits such as water or milk may be made containing the arsenic trioxide-hexahydric alcohol solutions of the present invention. Such liquid baits cannot be carried away by rats or mice to present hazards if found by children, pets or domestic animals.

Baits containing enough of the arsenic trioxide solution in hexahydric alcohol to correspond to a 2% concentration of arsenic trioxide are preserved indefinitely against putrefaction. Baits consisting of raw meat, raw eggs, milk and fish have been kept in open dishes for months without putrefying. The liquid may dry out but the solid bait merely had a dry film caked on the surface. The preservative action makes it possible to prepare large amounts of bait material from perishable foods and pack it away for future use without refrigeration. When a sorbitol solution of arsenic trioxide is used, its humectant action helps keep bait soft and moist and therefore more attractive to rodents and insects.

Although aqueous solutions of arsenic trioxide frequently precipitate $As_2O_3$ when cold, the hexahydric alcohol solutions of arsenic trioxide do not precipitate $As_2O_3$ with age or with temperature change.

Technical grades of the hexahydric alcohols containing proportions of other related polyhydric bodies may be used in lieu of pure mannitol and pure sorbitol. Mixtures of mannitol and sorbitol may also be used.

In view of the above, it will be seen that the several objects of the invention are achieved and other advantageous results attained.

As many changes could be made in the above methods and products without departing from the scope of the invention, it is intended that all matter contained in the above description shall be interpreted as illustrative and not in a limiting sense.

I claim:

1. A solution of arsenic trioxide in a polyhydric alcohol selected from the group consisting of mannitol and sorbitol, said solution being toxic to rodents and insects.

2. A poison bait for rodents and insects comprising a bait material and a solution of arsenic trioxide in a polyhydric alcohol selected from the group consisting of mannitol and sorbitol.

3. A poison bait for rodents and insects containing a bait material and as the poisonous ingredient a solution of arsenic trioxide in a polyhydric alcohol selected from the group consisting of mannitol and sorbitol.

4. The method of killing rodents and insects which comprises feeding the rodent or insect a composition containing as a poisonous ingredient a solution of arsenic trioxide in a polyhydric alcohol selected from the group consisting of mannitol and sorbitol.

5. The method of forming a poison for insects and rodents which comprises mixing together a hexahydric alcohol selected from the group consisting of mannitol and sorbitol and arsenic trioxide and heating the mixture to dissolve the arsenic trioxide in the hexahydric alcohol.

E. FRANCIS SENNEWALD.

REFERENCES CITED

The following references are of record in the file of this patent:

UNITED STATES PATENTS

| Number | Name | Date |
|---|---|---|
| 1,450,123 | Baker | Mar. 27, 1923 |
| 1,630,776 | Hedenburg | July 26, 1927 |
| 1,988,175 | Merrill | Jan. 15, 1935 |
| 2,263,827 | Siegler | Nov. 25, 1941 |